United States Patent
Eichkorn et al.

(10) Patent No.: US 12,515,530 B2
(45) Date of Patent: Jan. 6, 2026

(54) INVERTER FOR AN ELECTRIC DRIVETRAIN, AND METHOD FOR OPERATING AN INVERTER

(71) Applicant: Robert Bosch GmbH, Stuttgart (DE)

(72) Inventors: Florian Eichkorn, Ludwigsburg (DE); Manfred Kirschner, Stuttgart (DE); Martin Trunk, Neuenstadt (DE); Vignesh Kuppusamy, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/691,117

(22) PCT Filed: Jul. 25, 2022

(86) PCT No.: PCT/EP2022/070769
§ 371 (c)(1),
(2) Date: Mar. 12, 2024

(87) PCT Pub. No.: WO2023/036511
PCT Pub. Date: Mar. 16, 2023

(65) Prior Publication Data
US 2024/0375522 A1  Nov. 14, 2024

(30) Foreign Application Priority Data
Sep. 13, 2021  (DE) ..................... 10 2021 210 089.9

(51) Int. Cl.
*B60L 15/00* (2006.01)
*H02P 27/06* (2006.01)

(52) U.S. Cl.
CPC ............ *B60L 15/007* (2013.01); *H02P 27/06* (2013.01)

(58) Field of Classification Search
CPC .. B60L 15/007; B60L 2210/40; B60L 3/0069; B60L 50/51; B60L 53/14; B60L 53/20; B60L 50/60; H02P 27/06
USPC .......... 320/109, 104, 107; 701/22; 307/10.1, 307/9.1; 180/65.29, 65.265, 65.21; 318/139
See application file for complete search history.

(56) References Cited

U.S. PATENT DOCUMENTS

2020/0023746 A1* 1/2020 Kim ........................ B60L 53/14
2020/0298722 A1* 9/2020 Smolenaers ............ H02J 7/345

FOREIGN PATENT DOCUMENTS

DE     102012216008 A1    3/2014
WO     WO-2020248023 A1 * 12/2020 .............. B60L 50/60

OTHER PUBLICATIONS

Translation of International Search Report for Application No. PCT/EP2022/070769 dated Nov. 23, 2022 (2 pages).

* cited by examiner

*Primary Examiner* — Elim Ortiz
(74) *Attorney, Agent, or Firm* — Michael Best & Friedrich LLP

(57) ABSTRACT

An inverter (100) for an electric drivetrain (300), wherein the inverter (100) comprises an input port (102) for connecting an energy source (104) and a charging device (106) connected in parallel for charging the energy source (104), an output port (112) for connecting a multi-phase electric machine (114), and a plurality of switch elements (120Px, 120Nx) of a bridge circuit. The inverter (100) is configured to open the switch elements (120Px, 120Nx) while the energy source (104) is being charged by the charging device (106).

8 Claims, 3 Drawing Sheets

INVERTER FOR AN ELECTRIC DRIVETRAIN, AND METHOD FOR OPERATING AN INVERTER

BACKGROUND

The invention relates to an inverter for an electric drivetrain and a method for operating an inverter. The invention also relates to a drivetrain comprising an inverter, as well as a vehicle comprising a drivetrain.

SUMMARY

Inverters for converting a direct voltage from an energy source into a multi-phase alternating voltage to supply an electric machine for, e.g., a vehicle's electric drivetrain are well known. According to publication DE 10 2012 216 008 A1, a safe state is set in an inverter in the event of a fault, preferably in the event of a fault within an inverter. This ensures the safety of people accessing the vehicle, e.g. emergency services in the event of an accident, and the integrity of the electrical system. In addition, no incorrect torque is set thereby. The inverter is usually controlled by a control apparatus comprising a microcontroller in a low-voltage part of the inverter. If the low-voltage supply fails, an independent, redundant second control apparatus in a high-voltage section of the inverter can automatically switch the inverter to a safe state in order to prevent possible damage to electrical components. Damage can, e.g., be caused by an uncontrolled energy input due to the induced voltage of the rotating electric machine in the DC link. The inverter is fed from the DC link via an energy source connected thereto. Conventional methods provide various switching states in the form of what are referred to as safe states. For example, all switch elements connected to the low potential, so-called low-side switches, can be closed and all switch elements connected to the high potential, so-called high-side switches, can be opened. This operating mode is also referred to as an active short circuit or short circuit to low potential. Alternatively, all high-side switches can be closed and all low-side switches opened to create a short-circuit state at high potential. In another switch-off method, all switches of the pulse inverter are opened. This is also a safe condition, and it is also referred to as freewheeling mode. A safe state can be set via a software-independent, redundant switch-off path with a low probability of failure, so that the switch elements are switched to a safe state even in the event of serious internal faults, such as the loss of the microcontroller supply.

If the energy source of a drivetrain is discharged, it must be recharged so that the drivetrain or the vehicle comprising the drivetrain is ready for use again. For this purpose, the energy source is charged at a high DC voltage using a charging device when the vehicle is stationary and therefore when the electric machine is stationary or not rotating or turning. This DC voltage is also present at the inverter during the charging process, as the energy source is electrically connected to the inverter. To ensure the safety of the inverter, it and preferably the switch elements of the bridge circuit of the inverter must be actively controlled. For this purpose, the inverter is preferably driven into the short-circuit state at low potential, preferably by means of the control device in a low-voltage part of the inverter. In the short-circuit state at low potential, all switch elements connected to the low potential are closed so that the windings of a connected electric machine are short-circuited. This control leads to a low-voltage power consumption during charging. In addition, half of the switch elements, i.e. the open switch elements, are loaded at a full DC link voltage over the entire charging time.

There is therefore a need to minimize this power consumption and the load on the switch elements in order to shorten the necessary charging time, reduce the energy requirement by increasing the efficiency and ultimately increase the service life of the electronic components.

An inverter for an electric drivetrain is provided, the inverter comprising an input port for connecting an energy source and a charging device connected in parallel for charging the energy source, an output port for connecting a polyphase electric machine and a plurality of switch elements of a bridge circuit. The inverter is characterized by being configured to open the switch elements while the energy source is being charged by the charging device.

An inverter for an electric drivetrain is provided.

An inverter is used to convert a direct voltage into an alternating voltage and/or vice versa. Accordingly, an inverter in one respect comprises an input port, to which a DC voltage source (an energy source) can be connected. In this context, the term "connecting" means electrically connecting, contacting, or establishing an electrical connection between the inverter and the port contacts of the energy source. The energy source can be an electric battery, a traction battery, or a fuel cell. The electrical energy from the DC voltage source is converted into a multi-phase AC voltage within the inverter by means of a bridge circuit to supply a multi-phase load. For this purpose, the inverter comprises an output port to which a multi-phase electric machine can be connected as a load. Connecting means electrically connecting, contacting or establishing an electrical connection between the inverter and the port contacts of the electric machine. A polyphase synchronous machine or asynchronous machine can preferably be connected as the electric machine. To convert the electrical energy, a bridge circuit comprises a plurality of switch elements comprising. For example, a B6 bridge for supplying a three-phase load comprises six switch elements. Two switch elements are in this case connected in series to form an H-bridge. The series connection is connected between the upper potential and the lower potential of the input port. A center tap between the two switch elements, i.e. an upper and a lower switch element, is electrically connected to a phase or a potential of the output port. Consequently, an electrical connection between the upper potential of the input port and the phase can be established by closing an upper switch element and an electrical connection between the lower potential of the input port and the phase can be established by closing a lower switch element By opening and closing the two switches alternately and offset in each case, a DC voltage present at the input port is provided as an AC voltage at the output port, e.g. by means of pulse width modulation or block commutation. A corresponding H-bridge is provided for each phase of the output port. A charging device can be connected to the input port of the inverter in parallel with the DC voltage source. The energy source is thus able to be charged by means of the charging device. For this purpose, the charging device draws electrical energy from an electrical power supply network or an electrical storage system. The charging device converts this electrical energy, DC voltage or AC voltage, into a sufficiently high DC voltage. This DC voltage is electrically connected to the port contacts of the energy source. As long as the DC voltage provided by the charging device is greater than the current voltage of the energy source, the electrical energy flows into the energy source. The energy source is charged thereby. While the energy source is being charged, the DC voltage is also present at the input port of the inverter due to the electrical parallel connection of the energy source to be connected and the charging device. The inverter is configured to open the switch elements of the bridge circuit, in particular during charging of the energy source by means of the charging device.

All switch elements between the input port and the output port of the inverter are thus open.

As a result, a current flow between the energy source and the electric machine is prevented during charging. The advantage is that individual switch elements are not loaded with full DC link voltage during the charging time.

In another embodiment of the invention, the inverter comprises a data storage means having a memory content. The inverter is configured to provide a first or second safe state depending on the storage content. Setting the first safe state comprises opening the switch elements. In particular, setting the second safe state comprises closing all lower or all upper switch elements of the bridge circuit.

The inverter comprises a data storage means having a memory content. In a simple case, a data storage means is, e.g., an electronic component that can assume at least two different states. These different states are, e.g., referred to as memory content. The memory content of a data storage means can be read electronically. The inverter is designed to set a first or second safe state depending on the storage content. Safe states for an inverter are known, as explained above, to ensure the safety of persons accessing the vehicle and the integrity of the electrical system. Setting the first safe state involves opening the switch elements of the bridge circuit. The setting of the second safe state comprises in particular the closing of all lower or all upper switch elements of the bridge circuit.

An inverter is provided that sets a first or second safe state depending on the contents of the storage unit. Advantageously, an inverter is provided in which the setting of a first or second safe state can be preset by specifying a memory content.

In another embodiment of the invention, the inverter features a driving mode and a charging mode. The inverter is configured to preset the memory content of the data storage means such that the first safe state is set as the safe state during operation in charging mode and, in particular, to preset the memory content of the data storage means such that the second safe state is set as the safe state during operation in driving mode.

An inverter features various operating modes. While a vehicle is being driven, the inverter is operated in a driving mode. In the driving mode, the inverter converts electrical energy applied to the input port and makes it available at the output port or the inverter converts the electrical energy of a connected energy source and transmits it to a connected multi-phase electric machine. The rotor of the multiphase electric machine preferably rotates during the driving mode. During a charging operation of the vehicle, in which the connected energy source is charged by means of the charging device, the inverter is operated in a charging mode in which a DC voltage is applied to the input port. Preferably, the rotor of the multiphase electric machine is stationary during the charging mode and preferably the rotor does not rotate. In charging mode, the inverter disconnects the electrical connection between the input port and the output port or the inverter disconnects the electrical connection between a connected energy source and the multiphase electric machine. The inverter specifies the memory content of the data storage means so that the first safe state is set as the safe state during operation in charging mode. Consequently, the inverter opens all switch elements of the bridge circuit in the charging mode, in which the energy source is charged by means of the charging device, depending on the available storage content. In particular, the inverter specifies the memory content of the data storage means such that the second safe state is set as the safe state during operation in driving mode. Preferably, the setting of the second safe state comprises the closing of all lower or all upper switch elements of the bridge circuit. Advantageously, an inverter is provided which, depending on the current operating mode, provides a first or second safe state as a safe state and thus ensures improved safety and service life.

In another embodiment of the invention, the inverter comprises at least one impedance which is connected in parallel with a switch element of the bridge circuit. Preferably, an impedance is connected in parallel to each of the lower and/or upper switch elements. Preferably, an impedance comprises an ohmic resistance, a capacitance and/or an inductance.

An impedance is connected in parallel to at least one switch element of the bridge circuit or to each of the lower and/or upper switch elements of the bridge circuit. The parallel-connected impedances ensure that a voltage applied to the bridge circuit is distributed in a defined or even manner across the bridge branches and the individual switch elements. It is therefore preferable for the impedances at the individual switch elements to be the same to ensure uniform distribution. Preferably, an impedance comprises an ohmic resistance, a capacitance and/or an inductance. The ohmic resistors are preferably very high ohmic, preferably between approx. 100 kOhm and 10 MOhm.

Advantageously, an inverter is provided in which the voltage applied to the bridge circuit is distributed in a defined and/or uniform manner to the switch elements when the switch elements are open. This controls and balances the load on the switches and increases the service life of the inverter.

In another embodiment of the invention, the inverter comprises a low-voltage part and a high-voltage part, whereby the inverter provides the safe state by means of the high-voltage part.

An inverter is provided which, on the one hand, comprises a low-voltage part, which preferably comprises the control electronics for controlling the bridge circuit, preferably for the driving mode, and/or communication with other vehicle control units. The low-voltage part of the inverter is preferably supplied with electrical energy via a connected low-voltage on-board power supply. Furthermore, the inverter comprises a high-voltage part, which preferably comprises the high-voltage-carrying electrical components in the inverter, such as busbars, the DC link capacitor, the bridge circuit and the gate driver. The high-voltage part of the inverter is preferably supplied with electrical energy by means of a connected high-voltage traction network, to which the energy source is also connected. The high-voltage part comprises a circuit for setting a safe state. Advantageously, an inverter is provided which, in the event of a defective low-voltage section or insufficient low-voltage section power supply, still provides a safe state from the high-voltage section alone. Consequently, a safe state, preferably freewheeling, is advantageously set by means of the high-voltage section in a charging mode depending on the storage content in the event of an insufficient supply to the low-voltage section.

In another embodiment of the invention, the high-voltage part comprises the data storage means. The inverter is configured to set the memory content of the data storage means by means of a signal from the low-voltage section to the high-voltage section.

The high-voltage section also comprises the data storage means. The memory content of the data storage means is set and specified depending on a signal that is transferred from the low-voltage section to the high-voltage section. For this purpose, a digital signal is preferably transmitted from the low-voltage to the high-voltage part of the inverter via an insulation barrier. The information of the signal is stored in the data storage means as memory content, preferably in a register, latch or status latch at a low failure rate. Preferably, two pieces of information are transmitted via a digital signal with a modulated clock ratio and frequency. Preferably, this makes it possible to save a digital signal via the isolation barrier, whereby a converter channel or optocoupler can be saved. Preferably, a microcontroller, the main microcontroller, of the low-voltage part of the inverter sends a clock signal via a digital isolator. This signal preferably contains the two pieces of information that are encoded in frequency and clock ratio. Preferably, the clock ratio of the signal indicates as information of the signal whether the first safe state or the second safe state is to be set as the safe state. Preferably, the frequency indicates as other information whether the safe state is triggered or set. The safe state is triggered or set when the signal falls below a frequency threshold. Preferably, the data storage means or the latch evaluates both pieces of information and stores the first piece of information, the type of safe state, as memory content. Preferably, both pieces of information are forwarded to the gate driver via a logic circuit, which is preferably linked with other information, in order to set a safe state. Preferably, the information that the safe state is triggered causes the latch to be blocked. As a result, the information about which of the two safe states is intended to be set can no longer be changed as long as the safe state can no longer be recalled. Preferably, the signal frequency is evaluated much faster than the clock ratio, which means that static signals are immediately recognized as such and the previously transmitted safe state can be reliably stored and set. The latch can consist of analog or digital logic modules. Alternatively, two digital signals can be used instead of the one modulated clock signal to transmit the two pieces of information to the data storage means or the latch. Preferably, the memory content acts directly on a redundant switch-off path, preferably in the high-voltage section, and sets the freewheeling, i.e. the opening of the switch elements of the bridge circuit, as a safe state during charging of the energy source or during the charging mode.

An allocation of the necessary components that enable safe operation of an inverter is advantageously provided.

In another embodiment of the invention, the inverter is configured to switch off the low-voltage part while the energy source is being charged by the charging device.

The inverter switches off the low-voltage section while the energy source is being charged by the charging device or during charging mode. Accordingly, the frequency of the signal from the low-voltage section drops so that, e.g., the inverter switches to the safe state depending on the storage content. The inverter sets the memory content of the data storage means in charging mode so that the first safe state, namely freewheeling, is set as the safe state. The inverter is controlled via the high-voltage section during charging mode to set a safe state. The high-voltage section is preferably supplied by a high-voltage traction network. The energy source is preferably connected to the high-voltage traction grid. The safe state is set depending on the memory content in the data storage means or in the latch, whereby the low-voltage part of the inverter can be switched off during the charging mode. Preferably, the memory content of the data storage means or the latch holds the second safe state, preferably the active short circuit, as a safe state in normal operation or driving mode, independently of the microcontroller, in order to ensure torque and high-voltage safety. Preferably, the memory content is only set to switch to the first safe state or freewheel when the data storage means receives a reset signal and a modulated clock signal. Preferably, the output signal of the latch, depending on the memory content of the data storage means or the latch, directly controls the output stage of the gate driver via digital or analog logic to close or open the switch elements. The energy consumption of the inverter during charging is minimized. Preferably, almost no electrical power is consumed during the charging mode via the connected low-voltage electrical system, which is preferably used to supply the low-voltage part of the inverter.

The invention also relates to a drivetrain of a vehicle comprising an inverter.

A drivetrain comprising an inverter is provided. A drivetrain of a vehicle preferably comprises an energy source, a charging device, and/or an electric machine. The modification of said drivetrain comprising a described inverter as described enables minimal power consumption and load during charging of the energy source.

The invention further relates to a vehicle comprising a drivetrain, as described hereinabove. Advantageously, a vehicle is provided in which power consumption and load are minimized during charging of the energy source.

The invention further relates to a method for operating an inverter, the inverter comprising an input port for connecting an energy source and a charging device connected in parallel for charging the energy source, an output port for connecting a polyphase electric machine, and a plurality of switch elements of a bridge circuit. The method comprises the following steps: opening the switch elements while the energy source is being charged by the charging device.

A current flow between the energy source and the electric machine is advantageously prevented during charging. The advantage is that individual switch elements are not loaded at a full DC link voltage during the charging time.

It is understood that the features, properties, and advantages of the inverter apply or can be applied accordingly to the method or drivetrain and the vehicle, and vice versa.

BRIEF DESCRIPTION OF THE DRAWINGS

Further features and advantages of embodiments of the invention follow from the subsequent description with reference to the accompanying drawings.

The invention will be explained in further detail hereinafter with reference to the drawings.

DETAILED DESCRIPTION

Figure 1:
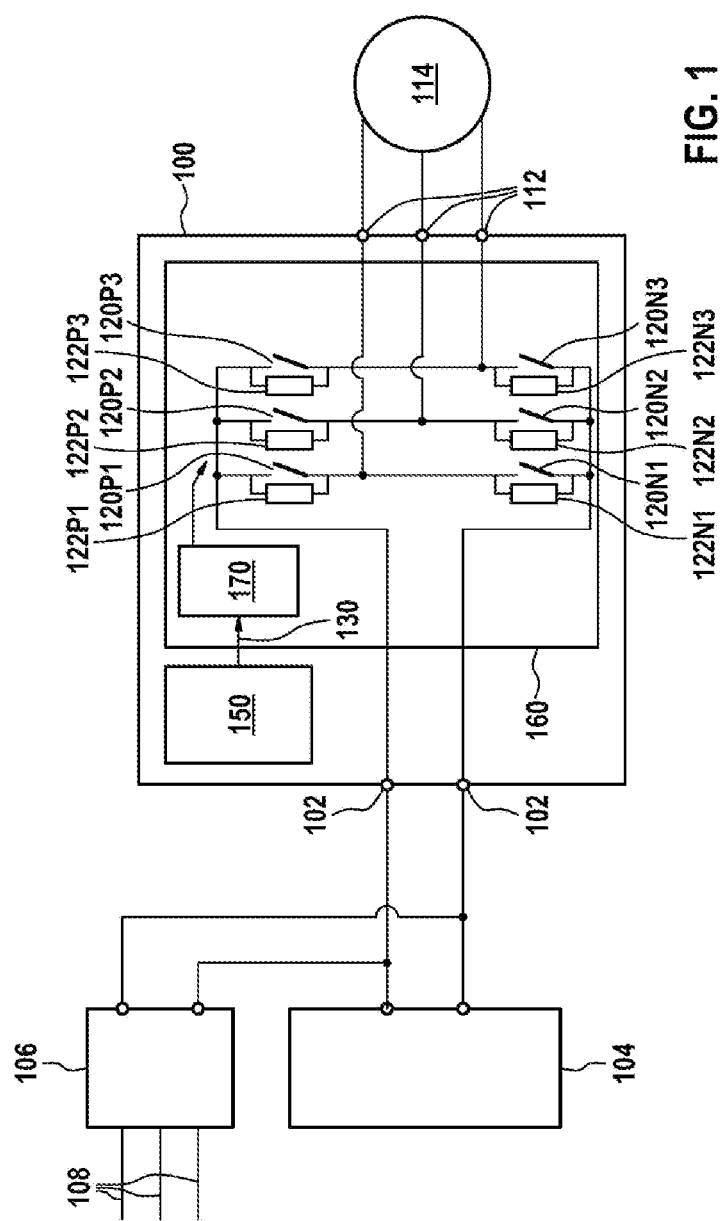
FIG. 1 a schematic representation of an inverter.

FIG. 1 shows an inverter 100 comprising an input port 102 for connecting an energy source 104. The energy source 104 is preferably a battery, an accumulator, a high-voltage battery or also a fuel cell, which is configured to provide a DC voltage at the input port 102 of the inverter 100. A charging device 106 is connected in parallel to the energy source 104. The charging device 106 is configured to receive electrical energy 108 from a power supply network or a storage battery. This electrical energy 108 can be available as DC voltage or AC voltage. The charging device 106 transforms the electrical energy 108 into a charging voltage adapted to the energy source, and preferably its state of charge, and delivers this via the electrical connections to the energy source 104 during charging of the energy source 104. The inverter comprises a multiphase output port 112 for connecting a multiphase electric machine 114. The inverter comprises a plurality of switch elements 120Px, 120Nx of a bridge circuit. FIG. 1 shows an example of a B6 bridge comprising three half bridges, each comprising an upper 120Px and a lower 120Nx switch element. The switch elements 120Px, 120Nx are preferably IGBTs or MOS-FETS. Preferably, the switch elements 120Px, 120Nx comprise an intrinsic free-wheeling diode or body diode. A freewheeling diode is preferably connected in parallel with the switch elements 120Px, 120Nx as an alternative. For reasons of clarity, these freewheeling diodes are not shown in FIG. 1. The series connection of a half-bridge comprising upper and lower switch elements is connected between the potentials of the input port 102 and a center tap between the two switch elements 120Px, 120Nx is connected to a potential of the polyphase output port 112. Within the inverter 100, a DC voltage present at the input port 102 is converted into an AC voltage, preferably in driving mode, by means of staggered and alternating closing and opening of the upper 120Px and lower 120Nx switch elements and is provided at the output port 112 in multiphase for supplying a connectable electric machine 114. Preferably, the inverter comprises impedances 122Px and 122Nx, which are each connected in parallel to a switch element 120Px, 120Nx. The connectable electric machine 114 can, e.g., be any multiphase permanent-magnet excited or separately excited synchronous or asynchronous machine. FIG. 1 also shows a low-voltage section 150 of the inverter and a high-voltage section 160 that is separated and insulated from it. The inverter 100 is preferably configured to transmit a signal 130 from the low-voltage section 150 to the high-voltage section 160. Preferably, it is transmitted within the high-voltage section to a data storage means 170 and the information is stored there as memory content. Furthermore, the inverter is configured to preferably set a predefined safe state as a function of the memory content (shown in FIG. 1 by the arrow from the data storage means in the direction of the bridge circuit). The inverter is in this case configured to open all switch elements 120Px, 120Nx while the energy source 104 is being charged by means of the charging device 106.

Figure 2:
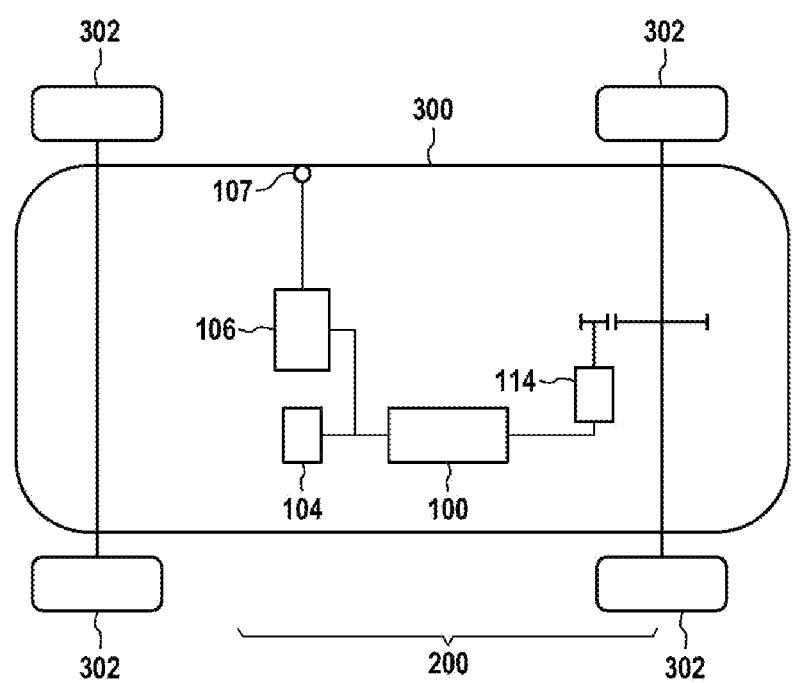
FIG. 2 a schematic representation of a vehicle comprising a drivetrain.

FIG. 2 shows a schematic representation of a vehicle 300 comprising four wheels 302 and a drivetrain 200. The vehicle 300 is shown comprising four wheels 302 herein only by way of example, although the invention is equally applicable to any vehicle comprising any number of wheels on land, water, and in the air. The drivetrain 200, which is shown by way of example, comprises at least one inverter 100. Further, the drivetrain preferably comprises an electrical power source 104 and or a multi-phase electric machine 114. The energy from the DC voltage source or energy source 104 is converted by the inverter 100 into a multiphase AC voltage for operating the electric machine 114 as a drive unit for the vehicle 300. Preferably, the drivetrain comprises a charging device 106, which is electrically connected to the energy source 104 and connected in parallel to charge it. Furthermore, the charging device is connected to an interface 107, preferably a charging socket on the body of the vehicle, in order to connect the charging device preferably to a power supply network or to a battery storage unit in order to provide the electrical energy 108 for charging the energy source 104. Alternatively, the charging device can also be arranged outside the drivetrain and also the vehicle, e.g. in the infrastructure, in which case it is electrically connected to the energy source 104 and connected in parallel to charge it.

Figure 3:
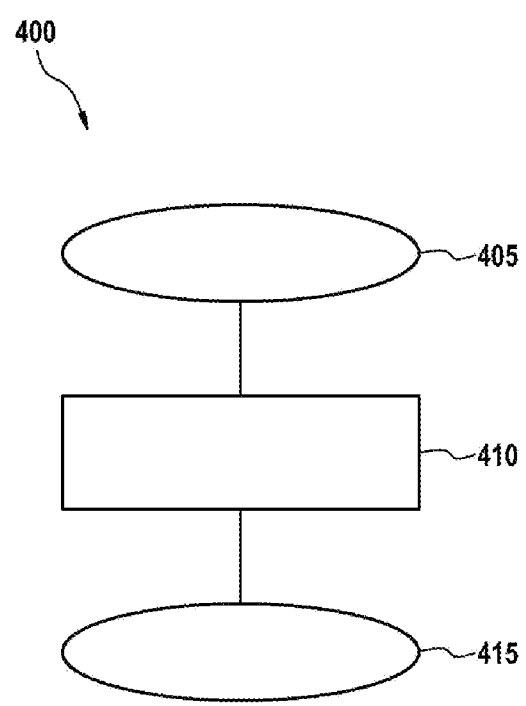
FIG. 3 a method for operating an inverter shown schematically.

FIG. 3 shows a schematic flow chart for a method 400 for operating an inverter 100. The method 400 starts with step 405. In step 410, all switch elements 120Px, 120Nx of the bridge circuit of the inverter are opened while the energy source 104 is being charged by means of the charging device 106. The method ends at step 415.

The invention claimed is:

1. An inverter (100) for an electric drivetrain (300),
    wherein the inverter (100) comprises an input port (102) for connecting an energy source (104) and a charging device (106), connected in parallel for charging the energy source (104), to
    a bridge circuit,
    an output port (112) for connecting a polyphase electric machine (114),
    a plurality of switch elements (120Px, 120Nx) of the bridge circuit, and
    data storage means (170) having a memory content,
    wherein
    the inverter (100) is configured to open the plurality of switch elements (120Px, 120Nx) of the bridge circuit while the energy source (104) is being charged by the charging device (106),
    and the inverter (100) is configured to set a first or a second safe state depending on the memory content, wherein the setting of the first safe state comprises the opening of the switch elements (120Px, 120Nx) and the setting of the second safe state comprises the closing of all lower (120Nx) or all upper (120Px) switch elements of the bridge circuit.

2. The inverter according to claim 1,
    wherein the inverter (100) features a driving mode and a charging mode, and wherein the inverter (100) is configured to set the memory content of the data storage means (170) such that the first safe state is set as the safe state during operation in the charging mode and to set the memory content of the data storage means (170) such that the second safe state is set as the safe state during operation in the driving mode.

3. The inverter according to claim 1,
    wherein the inverter (100) comprises a low-voltage part (150) and a high-voltage part (160), and the inverter (100) is configured to set the safe state by means of the high-voltage part (160).

4. The inverter according to claim 3,
    wherein the high-voltage part (160) comprises the data storage means, and the inverter (100) is configured to set the memory content of the data storage means (170) by means of a signal (130) from the low-voltage part (150) to the high-voltage part (160).

5. The inverter according to claim 3, wherein the inverter (100) is configured to switch off the low-voltage part (150) while the energy source (104) is being charged by means of the charging device (106).

6. A drivetrain (200) of a vehicle (300) comprising an inverter (100) according to claim 1.

7. A vehicle (300) comprising a drivetrain (200) according to claim 6.

8. A method (400) for operating an inverter,
wherein the inverter (100) comprises an input port (102) for connecting an energy source (104), a data storage means (170) having a memory content, and a charging device (106), connected in parallel for charging the energy source (104), to a bridge circuit,
an output port (112) for connecting a polyphase electric machine (114), and a plurality of switch elements (120Px, 120Nx) of the bridge circuit,
said method comprising the following steps:
opening (410) the plurality of switch elements (120Px, 120Nx) of the bridge circuit while the energy source (104) is being charged by means of the charging device (106); and
setting a first or a second safe state depending on the memory content, wherein the setting of the first safe state comprises the opening of the switch elements (120Px, 120Nx) and the setting of the second safe state comprises the closing of all lower (120Nx) or all upper (120Px) switch elements of the bridge circuit.

* * * * *